F. H. REAM.
SNUBBER.
APPLICATION FILED AUG. 15, 1921.

1,418,828.

Patented June 6, 1922.
3 SHEETS—SHEET 1.

INVENTOR
Fred H. Ream.
BY
M. C. Gillham.
ATTORNEY

F. H. REAM.
SNUBBER.
APPLICATION FILED AUG. 15, 1921.
1,418,828.
Patented June 6, 1922.
3 SHEETS—SHEET 2.
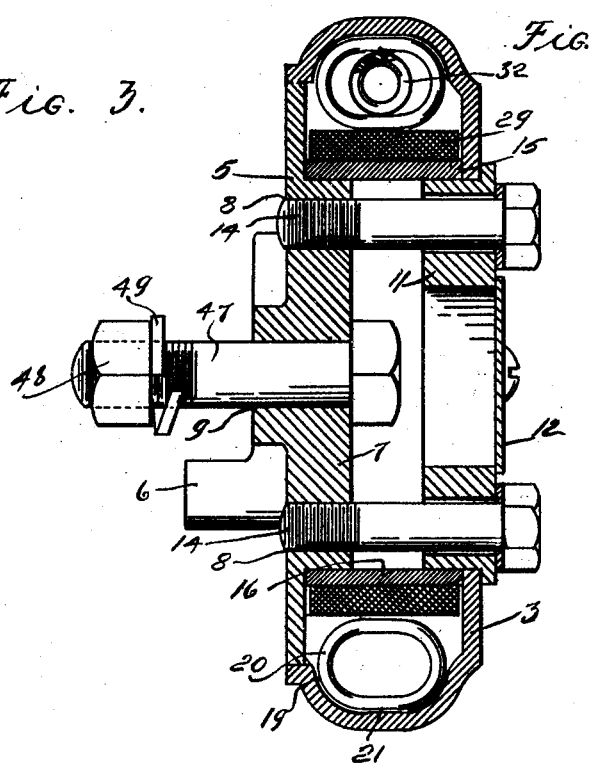
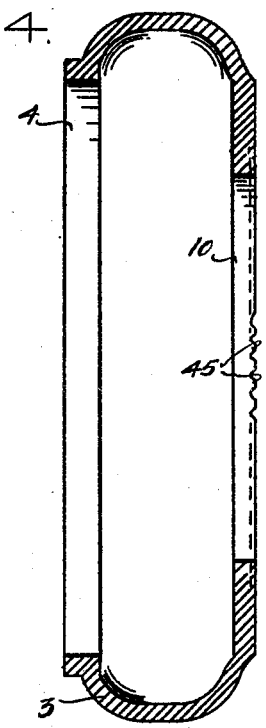
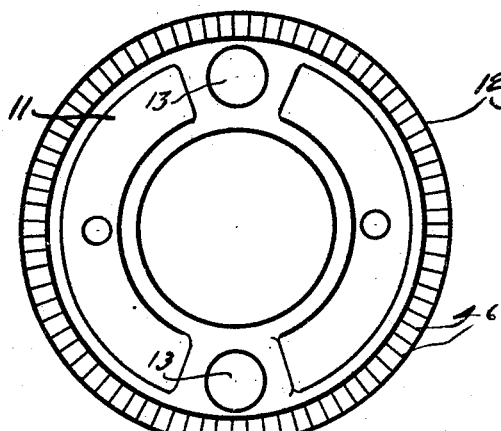
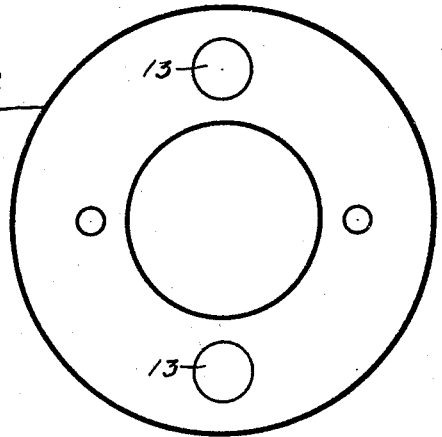
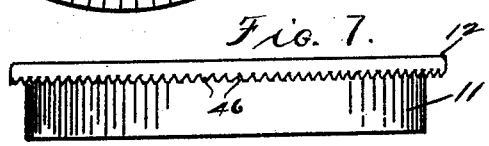
INVENTOR
Fred H. Ream.
BY
M. C. Gillham.
ATTORNEY

F. H. REAM.
SNUBBER.
APPLICATION FILED AUG. 15, 1921.

1,418,828.

Patented June 6, 1922.
3 SHEETS—SHEET 3.

INVENTOR
Fred H. Ream.
BY
M. C. Gillham.
ATTORNEY

UNITED STATES PATENT OFFICE.

FRED H. REAM, OF DAYTON, OHIO.

SNUBBER.

1,418,828.  Specification of Letters Patent.  Patented June 6, 1922.

Application filed August 15, 1921. Serial No. 492,461.

*To all whom it may concern:*

Be it known that I, FRED H. REAM, a citizen of the United States, residing at Dayton, in the county of Montgomery and State of Ohio, have invented a new and useful Snubber, of which the following is a specification.

My invention relates to snubbers, and particularly to a device of this character which may be applied on an automobile and wheeled vehicles to absorb shock vibrations set up by running over uneven road surfaces.

The objects of the invention are, first, to provide a snubber having facility for universal application to automobiles and wheeled vehicles and for ready access to its parts when membered and operatively mounted; second, to provide the snubber with auxiliary means for absorbing severe shocks and to absorb shocks sustained in quick succession; third, to provide the snubber with facility for relative adjustment of the housing when the device is mounted in operative position; fourth, to provide the snubber with a demountable drum to obtain maximum friction for snubbing shock and for providing facility for quick assembly and repair; fifth, to provide the snubber with webbing supports adapted for clamping the webbing on either channeled or round axles; and sixth to provide means for assuring the integrity of the connection between the webbing and the compression spring.

Figure 1:
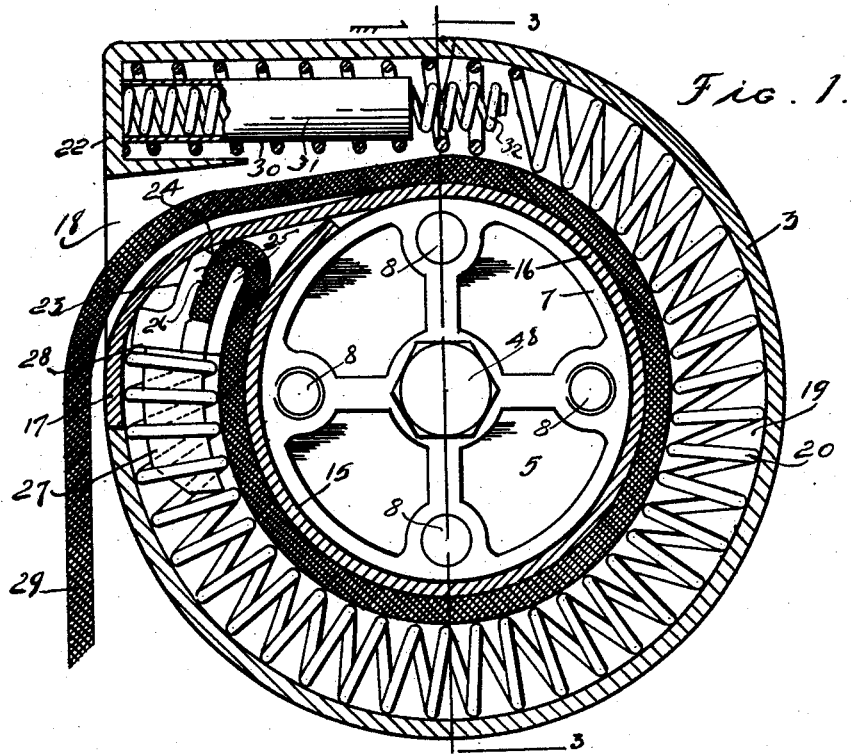
Figure 2:
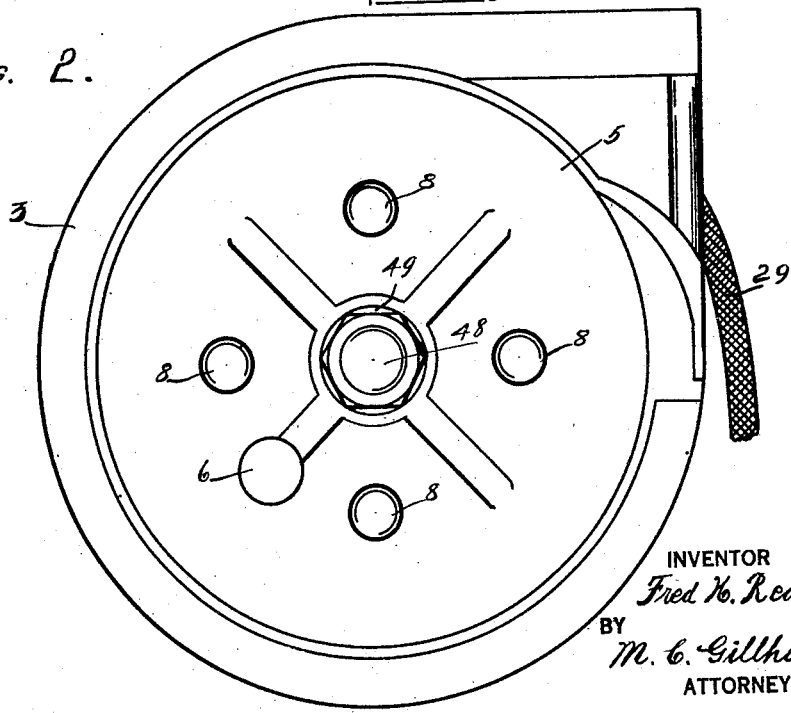
Figure 8:
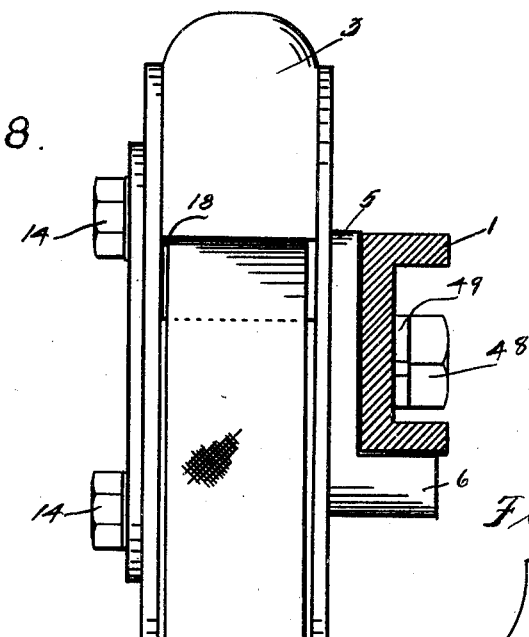
Figure 9:
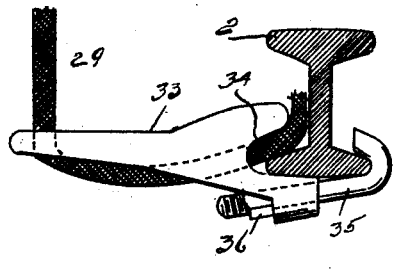
Figure 10:
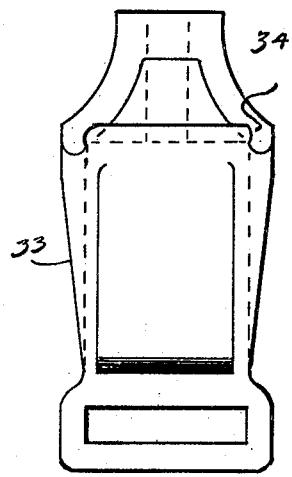
Figure 11:
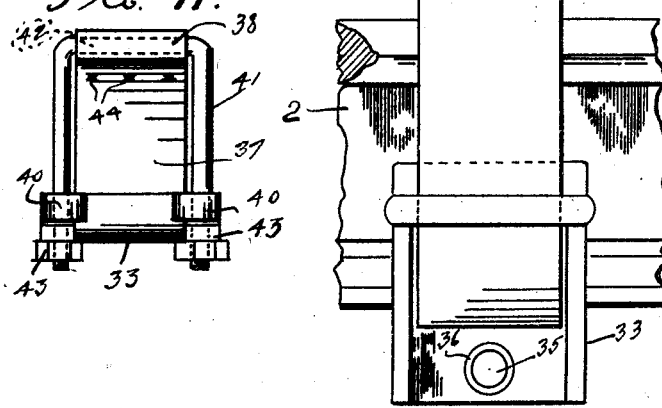
Figure 12:
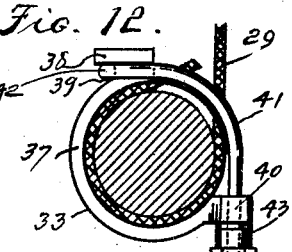

I attain these objects and other advantages by means of the mechanism and combination of parts illustrated in the accompanying drawings in which—Figure 1, is a vertical section of a snubber constructed in accordance with my invention; Figure 2, is a plan view of the rear side of the device; Figure 3, is a transverse section of the same, on the line 3—3, in Figure 1; Figure 4, is a transverse section of the housing member, and showing the annular series of serrations or corrugations thereon; Figure 5, is a plan view of the inner side of the cap member, and showing the annular series of serrations or corrugations thereon; Figure 6, is a plan view of the outer side of the cap member; Figure 7, is an edgewise view of the same; Figure 8, is a front elevation of the device in operative position; Figure 9, is a side elevation of the webbing support member for use on channeled axles; Figure 10 is a plan view of the webbing support member for use on channeled axles; Figure 11, is a front elevation of a modified form of webbing supporting member adapted for use on round axles, and Figure 12, is a side elevation of the same, and showing the method of attaching it on round axles.

Similar numerals of reference refer to corresponding parts throughout the several views.

The numeral 1, designates a cross section of the side member of the conventional chassis of an automobile, and 2, designates a fragmentary portion of a channeled front axle. The snubber device comprises a circular housing member 3, having at its rearward side an opening 4 for the reception therein of a circular base member 5, provided on its outer side with a stud projection 6, and on its inner side with a cylindrical plug portion 7, which is projected into the housing a little distance. A plurality of bolt holes 8, having internal screw threads, are arranged within the plug 7. A through bolt hole 9, is apertured in the base of the plug 7, at the horizontal axis thereof. A circular opening 10, is apertured in the front side of the housing member for the reception therein of a plug 11, on the inner side of a cap member 12, which plug is projected inwardly of the housing member a distance substantially the same as the projection therein of the plug 7, the projecting plugs of the base and cap members forming a bearing for an element which will be hereinafter described. Through bolt holes 13, are apertured in the cap member, within the cylindrical plug 11, in such a manner that said holes shall register with the bolt holes 8, in the base member 5. Screw bolts 14, are extended through the bolt holes 13, and screwed into the holes 8, which register therewith and, thereby the base member and the cap member are held assembled with the housing member. On the outer sides of the plugs 7 and 11, is idly mounted a drum member 15, having a concentrically formed portion 16, adapted for snugly receiving the plugs 7 and 11, and an integral tangentially extending curved leg 17, the lower end of which is brought to bear on the housing at the lower side of an opening 18, therein.

The periphery of the housing member is convexed to provide within the housing a concaved bed 19, which is adapted for receiving therein a spiral spring 20, the coils of which spring are, in this instance, formed oblong, as is particularly shown at 21, in Figure 3. The spring is held in its bed by means of a rigid head 22, integral with the housing and a movable head member 23, having a mouth 24, and lips 25, with teeth 26. On the inner end of the movable head 23, is an integral concentrically formed arbor 27, which is projected a suitable distance into the spring 20, to bring the lower end of the spring to bear on an anvil 28, integral with the back of the movable head 23. A strip of suitable flexible webbing 29, is slidably mounted on the drum 15, and its inner end is inserted into the mouth 24, and the lips 25, then forced inwardly upon the webbing, until the teeth 26, shall penetrate the webbing sufficiently to hold the latter firmly in place. In the upper end of the spiral spring 20, is a bumper member 30, which comprises a barrel 31, into which is projected a spiral spring 32, and which also projects outwardly of the barrel and inwardly of the spring 20, a distance adapted for receiving thereon the inner end of the arbor 27, when the spring 20, shall be suddenly compressed by a severe shock succeeding a light shock. The webbing 29, is extended over the drum 15, and through the opening 18, in the housing to outwardly of the same and, on the outer end of the webbing is slidably mounted a webbing supporting member 33, having a mouth 34, through and out of which the webbing passes, the mouth being extensive enough to also receive the lower flange of a channeled axle 2. The supporting member 33, is provided with a hook member 35, having a screw end on which is a nut 36, for drawing the hook to engage the rearward side of the axle and thereby force the member 33, to grip and bite the webbing and the front side of the axle to hold the webbing connected with the axle. A modified form of the webbing supporting member 33, is shown in Figures 11 and 12, and it consists of a concentrically formed band 37, having at its upper end a head 38, which is provided in the back thereof with a transverse groove 39, and at its lower end with horizontally aligned perforated bosses 40, provided with through bolt holes, and a loop 41, formed of metal rod and bent to form a transverse portion 42, to enter the groove 39, the side legs of the loop being bent to concentric form and adapted for piercing the bosses 40, the terminals of the legs being provided with screw threads to receive screw nuts 43, whereby the member may be clamped on a round axle. To prevent slipping of the webbing projections 44, are formed integral with the inner side of the band 37, and adapted for penetrating the webbing. For the purpose of providing means for the relative adjustment of the housing member when the device is operatively mounted on a chassis, that portion of the housing bordering on the opening 10, is provided with an annular series of radially extending serrations, corrugations or indentations 45, and the inner side of the peripheral margin of the cap member 12, is also provided with in annular series of radially extending serrations, corrugations or indentations 46, so that when the cap member is in place on the housing member, the series of annular serrations mentioned in both cases, shall mesh, thus permitting relative adjustment of the cap and housing members when the device is in operative position.

The housing member, the base member, and the cap member, are, preferably made of brass, as is also the drum member 15, to prevent oxidation of the parts mentioned. The spiral spring 20, is preferably made of steel wire of suitable temper and diameter, and galvanized to prevent oxide forming. The bumper and bumper spring are likewise treated.

The base member 5, is first mounted on the chassis, by perforating the side member of the chassis and extending therethrough and through the hole 9, a bolt 47, and then screwing the nut 48, on the bolt to draw the base plate 5, tightly against the chassis, with the stud 6, projecting directly below the side member of the chassis to prevent rotative movement of the base member.

To prevent running of the nut 48, a split washer 49, is disposed on the bolt beneath the nut. The housing member is then mounted on the base member, and the spring 20, bowed and placed in the bed 19, the bumper member being inserted in the upper end of the spring. The drum member 15, is then mounted on the plug 7, on the base member and the webbing 29, arranged on and over the drum, the head 23, on the inner end of the webbing is inserted in the lower end of the spring. The webbing supporting member 33, is then mounted on the outer end of the webbing and fastened on the axle, in this instance, the channeled axle. The cap member 12, is then set to place on the housing and the bolts 14, extended through the bolt holes 13, and screwed into the bolt holes 8, in the base member, thus completing the proper assembly of the parts. The cap member is rotated on the housing member until proper registry of the bolt holes 8 and 13, is obtained, thereafter the serrated margins of the cap and housing members will serve to hold the adjustment. When using the modified form of webbing supporting member 33, the webbing is drawn down under and partly around the axle, and then the band 37, is placed on the end portion of the webbing, the loop 41, is then placed astride the webbing and its upper end entered in the groove 39, and the limbs of the loop member are extended through the bosses 40, and the nuts 43, screwed to place on the screw ends of the limbs of the loop, thereby drawing the band 37, upon the webbing and forcing the same tightly against the axle, the projections 44, being forced to penetrate the webbing.

When the snubber device is assembled and properly mounted on an automobile, and the wheels of the latter run into a depression the webbing is thereby pulled outwardly of the device over the drum 15, effecting a compressing of the spring 20, the spring reacting to draw the webbing back when the shock has been absorbed. If the spring 20, is considerably compressed by shock and, before it can react, another shock is sustained in quick succession, the spring 20, will be compressed to maximum limit and the inner end of the arbor 27, will strike on the inner end of the bumper spring 32, which spring is tensioned to receive and absorb unusually severe shocks, while the spring 20, is tensioned to receive and absorb ordinary shocks incident to running over uneven road surfaces.

Having described my invention what I claim is—

1. A snubber device for automobiles, consisting of a circular housing member, a concaved bed in the periphery of said housing member, a spiral spring lodged in said bed, a base member demountably mounted in the rearward side of said housing member and provided outwardly with an outwardly projection and inwardly with an inwardly projecting cylindrical plug entering into said housing member, a cap member demountably mounted on the front side of said housing member and provided inwardly with an inwardly projecting plug entering into the housing member, a drum member having a concentrically formed portion mounted idly on the plug projections on said base and said cap members and a tangentially extending extension portion supportingly engaged by said housing member, a strip of flexible material connected with the lower end of said spiral spring and slidably bearing on said drum member and extending outwardly of said housing member, and means associated with the outer end of said strip adapted for clamping the strip on an axle.

2. A snubber device for automombiles, consisting of a circular housing member, a concaved bed in the periphery of said housing member, a spiral spring lodged in said bed, a yielding bumper member operating in the upper end of said spring, a base member demountably mounted in the rearward side of said housing member and provided outwardly with an outwardly projecting stud and inwardly with an inwardly projecting cylindrical plug entering into said housing member, a cap member demountably mounted on the front side of said housing member and provided inwardly with an inwardly projecting cylindrical plug entering into the housing member, a drum member having a concentrically formed portion mounted idly on the plug projections on said base member and said cap member and a tangentially extending extension portion supportingly engaged by said housing member, a strip of flexible material connected with the lower end of said spiral spring and slidably bearing on said drum member and extending outwardly of said housing member, and means associated with the end of said strip adapted for clamping the strip on an axle.

3. A snubber device for automobiles, consisting of a circular housing member, provided with an annular series of radially extending serrations or corrugations on its outer side, a concaved bed in the periphery of said housing member, a spiral spring lodged in said bed, a yielding bumper member operating in the upper end of said spring, a base member demountably mounted in the rearward side of said housing member and provided outwardly with an outwardly projecting stud and inwardly with an inwardly projecting cylindrical plug entering into said housing member, a cap member demountably mounted on the front side of said housing member and provided on the inner side thereof with an annular series of radially extending serrations or corrugations adapted for engaging the serrations or corrugations on the housing member and thereby obtain relative adjustment of the housing member and with an inwardly projecting cylindrical plug entering the housing member, a drum member having a concentrically formed portion mounted idly on the plug projections on said base member and said cap member and a tangentially extending extension portion supportingly engaged by said housing member, a strip of flexible material detachably connected with the lower end of said spiral spring and slidably bearing on said drum member and extending outwardly of said housing member, and means for attaching said strip on an axle.

4. In a snubber device for automobiles, the combination of an annular extending spiral spring, a yielding bumper member operating in the upper end of said spring, a head having an arbor projected into the lower end of said spring, a drum, and a strip of flexible material connected with said head and slidably mounted on said drum, whereby a pulling pressure applied to the strip will tension said spiral spring and excessive tensioning of the spring will be retarded by said bumper member.

5. In a snubber device for automobiles, the combination of an annular extending spiral spring, a head having an arbor projected into the lower end of said spring, a drum, and a strip of flexible material connected with said head and slidably mounted on said drum, whereby a pulling pressure applied to the strip will tension said spring.

Kansas City, Missouri, August 1st, 1921.

FRED H. REAM.

Witnesses:
R. W. WHITELAW,
JOHN C. STEARNS.